(12) United States Patent
Murakami et al.

(10) Patent No.: US 7,004,228 B2
(45) Date of Patent: *Feb. 28, 2006

(54) PROCESS FOR PRODUCING, THROUGH STRIP CASTING, RAW ALLOY FOR NANOCOMPOSITE TYPE PERMANENT MAGNET

(75) Inventors: Ryo Murakami, Kobe (JP); Hirokazu Kanekiyo, Kyoto (JP); Satoshi Hirosawa, Otsu (JP)

(73) Assignees: Santoku Corporation, Kobe (JP); Neomax Co., Ltd., Osaka (JP)

(*) Notice: Subject to any disclaimer, the term of this patent is extended or adjusted under 35 U.S.C. 154(b) by 252 days.

This patent is subject to a terminal disclaimer.

(21) Appl. No.: 10/381,412

(22) PCT Filed: Sep. 25, 2001

(86) PCT No.: PCT/JP01/08317

§ 371 (c)(1),
(2), (4) Date: Mar. 25, 2003

(87) PCT Pub. No.: WO02/30595

PCT Pub. Date: Apr. 18, 2002

(65) Prior Publication Data

US 2003/0183305 A1   Oct. 2, 2003

(30) Foreign Application Priority Data

Oct. 6, 2000   (JP)   ............................... 2000-307671

(51) Int. Cl.
*B22D 11/00* (2006.01)
*H01F 1/057* (2006.01)

(52) U.S. Cl. ...................... 164/463; 164/474; 148/101; 148/102; 148/103; 148/538; 148/541

(58) Field of Classification Search ................ 148/100, 148/101, 102, 103, 538, 541; 164/463, 474
See application file for complete search history.

(56) References Cited

U.S. PATENT DOCUMENTS

| 4,770,723 A | 9/1988 | Sagawa et al. |
| 4,802,931 A | 2/1989 | Croat |

(Continued)

FOREIGN PATENT DOCUMENTS

DE   19739959   3/1998

(Continued)

OTHER PUBLICATIONS

Hermann et al., "Growth Kinetics in Undercooled Nd-Fe-B Alloys with Carbon and Ti or Mo Additions" pp. 82-86, 04/2000, Journal of Magnetism and Magnetic Material, vol. 213, Nos. 1-2.

(Continued)

*Primary Examiner*—John P. Sheehan
(74) *Attorney, Agent, or Firm*—Keating & Bennett, LLP

(57) ABSTRACT

To make a raw alloy, consisting mostly of amorphous structure, highly productively and at a reduced cost for a nanocomposite magnet, a molten alloy represented by $Fe_{100-x-y-z}R_xQ_yM_z$ (where R is at least one element selected from Pr, Nd, Dy and Tb; Q is B and/or C; M is at least one element selected from Co, Al, Si, Ti, V, Cr, Mn, Ni, Cu, Ga, Zr, Nb, Mo, Ag, Pt, Au and Pb; and 1 at %$\leq$x<6 at %, 15 at %$\leq$y$\leq$30 at % and 0 at %$\leq$z$\leq$7 at %) is prepared. This molten alloy is rapidly cooled by a strip casting process in which the alloy is fed onto a chill roller, rotating at a peripheral velocity of 3 m/s to less than 20 m/s, at a feeding rate per unit contact width of 0.2 kg/min/cm to 5.2 kg/min/cm. In this manner, an alloy including at least 60 volume percent of amorphous phase can be obtained.

8 Claims, 6 Drawing Sheets

U.S. PATENT DOCUMENTS

| | | | |
|---|---|---|---|
| 4,836,868 | A | 6/1989 | Yajima et al. |
| 4,851,058 | A | 7/1989 | Croat |
| 4,935,074 | A | 6/1990 | De Mooij et al. |
| 5,022,939 | A | 6/1991 | Yajima et al. |
| 5,049,208 | A | 9/1991 | Yajima et al. |
| 5,209,789 | A | 5/1993 | Yoneyama et al. |
| 5,666,635 | A | 9/1997 | Kaneko et al. |
| 5,725,792 | A | 3/1998 | Panchanathan |
| 5,905,424 | A | 5/1999 | Panchanathan |
| 6,022,424 | A | 2/2000 | Sellers et al. |
| 6,172,589 | B1 | 1/2001 | Fujita et al. |
| 6,183,571 | B1 | 2/2001 | Inoue et al. |
| 6,183,572 | B1 | 2/2001 | Panchanathan et al. |
| 6,280,536 | B1 | 8/2001 | Inoue et al. |
| 6,302,972 | B1 | 10/2001 | Hirosawa et al. |
| 6,332,933 | B1 | 12/2001 | Ma et al. |
| 6,352,599 | B1 | 3/2002 | Chang et al. |
| 6,695,929 | B1 * | 2/2004 | Kanekiyo et al. ............ 148/101 |
| 6,790,296 | B1 * | 9/2004 | Kanekiyo et al. ............ 148/302 |
| 6,814,776 | B1 * | 11/2004 | Kanekiyo et al. ............. 75/244 |
| 6,890,392 | B1 * | 5/2005 | Kanekiyo et al. ............ 148/101 |
| 2005/0040923 | A1 * | 2/2005 | Miyoshi et al. ............. 335/302 |

FOREIGN PATENT DOCUMENTS

| | | |
|---|---|---|
| EP | 0632471 | 1/1995 |
| EP | 1 018 751 | 7/2000 |
| EP | 1 061 532 | 12/2000 |
| EP | 1104932 | 6/2001 |
| JP | 55-94151 | 7/1980 |
| JP | 55-094151 | 7/1980 |
| JP | 59-046008 | 3/1984 |
| JP | 60-009852 | 1/1985 |
| JP | 61-140350 | 6/1986 |
| JP | 64-703 | 1/1989 |
| JP | 64-7501 | 1/1989 |
| JP | 64-7502 | 1/1989 |
| JP | 01-100242 | 4/1989 |
| JP | 2-179803 | 7/1990 |
| JP | 2-247-309 | 10/1990 |
| JP | 2-247305 | 10/1990 |
| JP | 2-247306 | 10/1990 |
| JP | 2-247307 | 10/1990 |
| JP | 2-247308 | 10/1990 |
| JP | 2-247309 | 10/1990 |
| JP | 2-247310 | 10/1990 |
| JP | 2-298003 | 12/1990 |
| JP | 03-260018 | 11/1991 |
| JP | 03-261104 | 11/1991 |
| JP | 07-122412 | 5/1995 |
| JP | 7-166206 | 6/1995 |
| JP | 08-162312 | 3/1996 |
| JP | 08-167515 | 6/1996 |
| JP | 8-229641 | 9/1996 |
| JP | 8-335506 | 12/1996 |
| JP | 9-155507 | 6/1997 |
| JP | 09-155513 | 6/1997 |
| JP | 10-088294 | 4/1998 |
| JP | 10-265915 | 10/1998 |
| JP | 10-317109 | 12/1998 |
| JP | 11-071646 | 6/1999 |
| JP | 11-323509 | 11/1999 |
| JP | 2000-079449 | 3/2000 |
| JP | 2000-079451 | 3/2000 |
| JP | 2001-226753 | 8/2001 |
| JP | 2001-244107 | 9/2001 |
| JP | 2001-254159 | 9/2001 |
| WO | WO 99/21196 | 4/1999 |
| WO | WO 00/03403 | 1/2000 |
| WO | WO 00/45397 | 8/2000 |
| WO | WO 00/52713 | 9/2000 |

OTHER PUBLICATIONS

J.Bernardi, et al., "Microstructural analysis of stirp cast Nd-Fe-B alloys for high $(BH)_{max}$magnets", Journal of Applied Physics, vol. 83 No. 11, Jun. 1998, pp. 6396-6398.

Chang et al., "The Effect of La-Substitution on the Microstructure and Magnetic Properties of Nanocomposite NdFeB Melt Spun Ribbons", pp. 65-70, 03/97, Journal of Magnetism and Magnetic Materials, vol. 167, Nos. 1-2.

Chang et al., "High Performance $a$Fe/$R_2Fe_{14}$B-Type Nanocomposites with Nominal Compositions of $(Nd, La)_{9.5}$ $Fe_{78x}Co_xCr_2B_{10.5}{}^{(X-0.10)}$", Journal of Magnestism and Magnetic Materials, vol. 189, No. 1(10-1998), pp. 55-61.

Merkulova et al., "The Temperature Dependence of Coercivity in Nancrystaline Nd-Fe-B(TiC) Magnets", Journal of Applied Physics, vol. 87, No. 9, (05-2000), pp. 4738-4740.

Chiriac et al., "$ND_8Fe_{73}Co_5Hf_2B_{12}$Strip Cast Alloy", pp. 5338-5340, 05/2000, Journal of Applied Physics, vol. 87, No. 9.

Q. Chen, et al., "A Study on the Phase Transformation and Exchange-coupling of $(Nd_{0.95}La_{0.05})_{9.5}$ $Fe_{bal}Co_5Nb_2B_{105}$Nanaocomposites," Materials Research Society Symposium Proceedings, vol. 577, Apr. 1999, pp. 209-219.

Chang, et al., "The effect of boron and real earth contents on the magnetic properties of La and Cr substituted $a$-Fe/ $R_2Fe_{14}$B-Type Nanocomposites", Journal of Applied Physics, vol. 83 No. 11, Jun.1998, pp. 6271-6273.

Chang et al., "High Performance $a$Fe/$Nd_2Fe_{14}$B-Type Nanocomposites", pp. 121-123, 01/1998, Applied Physics Letters, vol. 72, No. 1.

Chang et al., "Magnetic and Microstructure Studies of Boron-Enriched $(Nd_{0.95}La_{0.05})11Fe_{76.5-x}Co_xTi_2B_{10.5}(x=0.15)$ Melt-Spun Ribbons", pp. 3312-3314, 09/2000, IEEE Transactions on Magnetics, vol. 36, No.5.

W. C. Chang et al.: "THE EFFECTS OF REFRACTORY METAL ON THE MAGNETIC PROPERTIES OF $a$-Fe/$R_2Fe_{14B}$B - TYPE NANOCOMPOSITES", IEEE TRANSACTIONS ON MAGNETICS; Sep. 1999; vol.35 No. 5; IEMGAQ; pp. 3265-3267.

Application No. 09/863,902, Filed May 24, 2001. "Permanent Magnet Including Multiple Ferromagnetic Phases and Method for Producing the Magnet."

R. Coehoorn, et al., "Novel Permanent Magnetic Materials Made by Rapid Quenching", Journal de Physique, C8, Dec. 1988, pp. 669-670.

* cited by examiner

PROCESS FOR PRODUCING, THROUGH STRIP CASTING, RAW ALLOY FOR NANOCOMPOSITE TYPE PERMANENT MAGNET

TECHNICAL FIELD

The present invention relates to a raw alloy for a permanent magnet for use in various types of motors, meters, sensors and loudspeakers, for example, and a method of making such a raw alloy. More particularly, the present invention relates to a raw alloy for a nanocomposite-type permanent magnet to be prepared by a strip casting process and a method of making such an alloy.

BACKGROUND ART

A nanocomposite-type permanent magnet, having a structure in which a hard magnetic phase such as $R_2Fe_{14}B$ and soft magnetic phases such as $Fe_3B$ and $\alpha$-Fe (i.e., high-magnetization ferromagnetic phases) are magnetically coupled together, is now under development as an R—Fe—B based magnet. A powder of a nanocomposite-type permanent magnet is compacted into a predetermined shape with a resin material, thereby forming an isotropic bonded magnet.

In producing a nanocomposite magnet, a rapidly solidified alloy, having either an amorphous structure or at least a structure consisting mostly of an amorphous phase, is often used as a start material thereof. When subjected to a heat treatment, this rapidly solidified alloy is crystallized and eventually becomes a magnetic material having a nanocrystalline structure with an average crystal grain size of about $10^{-9}$ m to about $10^{-6}$ m.

The structure of the heated and crystallized magnetic alloy heavily depends on the structure of the rapidly solidified alloy that is yet to be heated and crystallized. For that reason, to obtain a nanocomposite magnet having excellent magnetic properties, it is important how to define the conditions of rapidly cooling and solidifying a melt of the raw alloy because those conditions should determine the specific structure (e.g., the percentage of amorphous phase) of the resultant rapidly solidified alloy.

A rapid cooling process to be performed with a machine such as that shown in FIG. 1 is known as a conventional method of preparing such a rapidly solidified alloy including a greater volume percentage of amorphous phase. In this process, a molten alloy is ejected out of a nozzle, having an orifice at the bottom, toward a rotating roller made of copper, for example, and rapidly cooled by the roller, thereby obtaining a thin-strip amorphized solidified alloy.

Methods of this type have been researched and reported by universities and organizations that are engaged in the study of magnetic materials. However, a machine for use in those researches or reports is modeled just for experimental purposes so as to melt several tens to several hundreds grams of alloy inside of a nozzle and eject it out of the nozzle. That is to say, a machine having that low processing rate cannot mass-produce a raw alloy for a nanocomposite magnet.

Thus, a method of achieving increased processing rates is described in Japanese Laid-Open Publications No. 2-179803, No. 2-247305, No. 2-247306, No. 2-247307, No. 2-247308, No. 2-247309 and No. 2-247310, for example.

In this method, a molten alloy, which has been melted in a melting crucible, is poured into a container having an ejecting nozzle at the bottom, and then ejected out of the nozzle by applying a predetermined pressure onto the melt in the container (this method will be referred to herein as a "jet casting process"). By ejecting the melt through the nozzle while applying a pressure thereto in this manner, a stream of the melt (or a melt flow) having a relatively high flow rate can be ejected substantially perpendicularly toward around the top of the rotating roller. The ejected melt forms a puddle (i.e., a melt puddle) on the surface of the rotating roller. A portion of this puddle, which is in contact with the roller, is rapidly cooled and solidified, thereby forming a thin-strip rapidly solidified alloy.

In the jet casting process described above, the molten alloy and the rotating roller have just a short contact length. Accordingly, the melt cannot be rapidly cooled and solidified completely on the rotating roller, and the alloy at a high temperature (e.g., 700° C. to 900° C.) is still cooled and solidified even after having peeled off the rotating roller and while traveling in the air. In the jet casting process, the cooling process is carried out in this manner, thereby amorphizing any of various types of alloys.

In the jet casting process, however, if the processing rate is increased to an industrially mass-producible level (e.g., about 1.5 kg/min or more), the ejecting nozzle is worn out significantly with an increase in the feeding rate of the melt (or the melt ejecting velocity). As a result, the melt feeding rate is subject to change during the process, and the constant rapid cooling state cannot be maintained anymore. In addition, a huge nozzle cost should be needed in that case. Furthermore, since the melt ejecting velocity is limited by the nozzle diameter, it is difficult to increase the processing rate as intended.

Also, in the jet casting process, the melt might be solidified at the nozzle and possibly clog the nozzle up. Accordingly, a mechanism for keeping the container with the nozzle at a predetermined temperature is needed. Furthermore, to keep the melt ejecting rate constant, a mechanism for controlling the pressure on the surface of the melt inside the container and the pressure on the outlet of the nozzle is also needed. As a result, the initial equipment cost and equipment operation cost are both expensive.

Furthermore, to constantly achieve an appropriate cooling rate for an amorphous alloy by the jet casting process, the melt ejecting velocity needs to be relatively low (e.g., 1.5 kg/min or less). Thus, the jet casting process is not so productive. However, if the melt ejecting velocity is too high in the jet casting process, then no puddle might be formed on the surface of the roller but the melt might splash off, thus making the melt cooling rate inconstant.

Also, in the jet casting process, a rapidly solidified alloy including a greater volume percentage of amorphous phase is obtained by ejecting a small amount of melt onto a roller that rotates at a relatively high velocity (e.g., at a peripheral velocity of 20 m/s or more). Thus, the resultant thin-strip rapidly solidified alloy typically has a thickness of 50 $\mu$m or less. It is difficult to collect a thin-strip alloy having such a small thickness so efficiently as to increase the tap density thereof sufficiently.

On the other hand, a strip casting process is also known as another method of preparing a rapidly solidified alloy. In the strip casting process, a molten alloy is supplied from a melting crucible onto a shoot (or tundish) and then brought into contact with a chill roller, thereby making a rapidly solidified alloy. The shoot is a melt guiding means that controls the flow rate of the melt by temporarily reserving the melt thereon and rectifies the melt flow, thereby feeding the melt onto the chill roller constantly and continuously. The melt, which has come into contact with the outer circumference of the chill roller, moves along the circumference of the roller so as to be dragged by the rotating chill roller and cooled in the meantime.

In the strip casting process, the melt and the outer circumference of the roller have a relatively long contact length in the circumferential direction of the roller. Thus, the melt can be cooled and solidified substantially completely on the roller.

As described above, the strip casting process uses no ejecting nozzle unlike the jet casting process but feeds the molten alloy continuously onto the rotating roller by way of the shoot. Thus, the strip casting process is effective for mass production and can reduce the manufacturing cost.

In the strip casting process, however, a large amount of molten alloy is fed onto the roller and the rapid cooling rate tends to be low. For these reasons, the strip casting process is not effective for preparing an amorphized solidified alloy. If the rapid cooling rate is low, then an alloy including a smaller volume percentage of amorphous phase (i.e., including a greater volume percentage of crystalline structure) is formed easily. If there is a greater volume percentage of crystalline structure in the alloy structure, the crystalline structure will grow excessively from the crystalline nuclei in the subsequent heat treatment for crystallization. As a result, a nanocomposite magnet having excellent magnetic properties cannot be obtained.

For these reasons, the strip casting process is often used to make completely crystallized flakes of a metal (see Japanese Laid-Open Publication No. 8-229641, for example). A rapidly solidified alloy obtained in this manner is normally used as a raw alloy for a sintered magnet including an $R_2Fe_{14}B$ phase as its main phase, and cannot be used as a raw alloy for a nanocomposite magnet.

As described above, it has been difficult to make a raw alloy, including a greater volume percentage of amorphous structure, for a nanocomposite magnet highly productively and at a reduced cost.

In order to overcome the problems described above, an object of the present invention is to provide a raw alloy for a nanocomposite-type permanent magnet having excellent magnetic properties at a reduced cost.

DISCLOSURE OF INVENTION

An inventive method of making a raw alloy for a magnet includes the steps of: preparing a molten alloy represented by $Fe_{100-x-y-z}R_xQ_yM_z$, (where R is at least one element selected from the group consisting of Pr, Nd, Dy and Tb; Q is B and/or C; M is at least one element selected from the group consisting of Co, Al, Si, Ti, V, Cr, Mn, Ni, Cu, Ga, Zr, Nb, Mo, Ag, Pt, Au and Pb; and x, y and z satisfy 1 at %$\leq$x<6 at %, 15 at %$\leq$y$\leq$30 at % and 0 at %$\leq$z$\leq$7 at %); and obtaining a thin-strip alloy, including an amorphous structure, by a strip casting process, in which the molten alloy is brought into contact with a chill roller within a vacuum or in a reduced pressure atmosphere so as to have a predetermined contact width in an axial direction of the chill roller and in which the molten alloy is moved along an outer circumference of the chill roller and cooled by rotating the chill roller. In this method, the chill roller is rotated at a peripheral velocity of 3 m/s to less than 20 m/s, and the molten alloy is continuously fed onto the chill roller at a feeding rate per unit contact width of 0.2 kg/min/cm to 5.2 kg/min/cm.

In a preferred embodiment, the molten alloy is fed onto the chill roller at a feeding rate of at least 3 kg/min.

In another preferred embodiment, the molten alloy is brought into contact with the chill roller by way of a shoot, which can control the flow of at least a portion of the molten alloy toward the chill roller. The shoot includes a plurality of melt drains, each of which is located in the vicinity of the chill roller and which has a predetermined teeming width as measured in the axial direction of the chill roller. Multiple thin-strip alloys are made from the molten alloy that has passed through the melt drains and contacted with the chill roller.

In another preferred embodiment, the predetermined contact width is 0.5 cm to 10.0 cm.

In another preferred embodiment, the thin-strip alloy has a metal structure that includes at least about 60 volume percent of amorphous structure.

In another preferred embodiment, the method further includes the step of continuously crushing the thin-strip alloy and collecting the crushed alloy such that a tap density thereof becomes at least equal to 1 g/cm$^3$.

A magnet raw alloy according to the present invention is prepared by the method according to any of the preferred embodiments of the present invention described above. The raw alloy has a coercivity $H_{cJ}$ of at most 10 kA/m before being heated and crystallized.

In a preferred embodiment, the raw alloy has a thickness of 70 $\mu$m to 250 $\mu$m.

An inventive method of evaluating a raw alloy for a magnet includes the steps of: measuring the coercivity of a solidified alloy that has been obtained by rapidly cooling a melt of a magnetic alloy; and estimating the percentage of an amorphous phase to the solidified alloy based on the coercivity measured.

Another inventive method of evaluating a raw alloy for a magnet includes the steps of: measuring the quantity of heat that has been generated by a solidified alloy, which was obtained by rapidly cooling a melt of a magnetic alloy, during its crystallization; and estimating the percentage of an amorphous phase to the solidified alloy based on the heat quantity measured.

An inventive method of making a raw alloy for a magnet includes the steps of: estimating the percentage of an amorphous phase to the solidified alloy by one of the evaluating methods of the present invention; and heating and crystallizing the solidified alloy that has been prepared under such a condition that the estimated percentage of the amorphous phase becomes at least equal to a predetermined percentage.

BEST MODE FOR CARRYING OUT THE INVENTION

Figure 1:
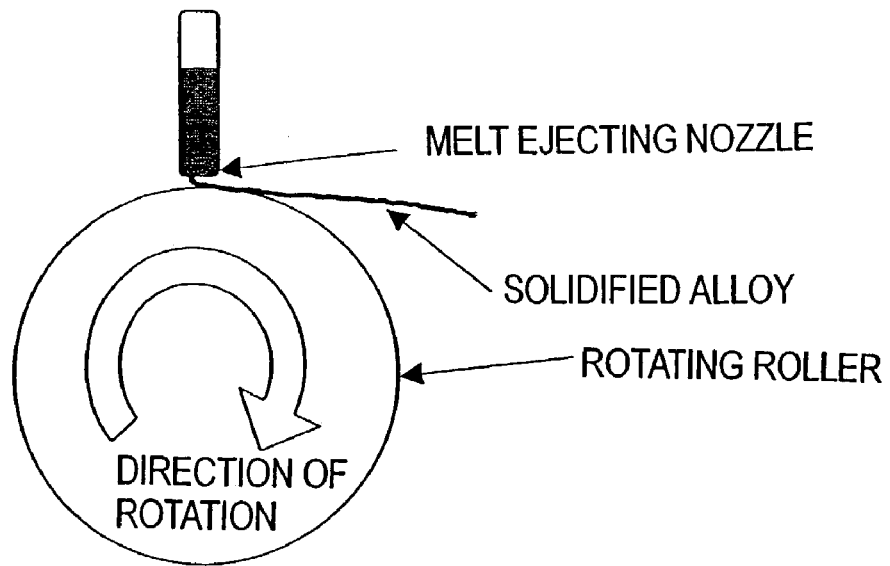
FIG. 1 is a side view illustrating a nozzle and a rotating roller for use in a conventional jet casting process.

To obtain a raw alloy for a nanocomposite-type permanent magnet, which can exhibit excellent magnetic properties when subjected to heat treatment, at a reduced manufacturing cost, the present inventors carried out an extensive research on the method of preparing a rapidly solidified alloy including a greater volume percentage of amorphous phase. If the conventional jet casting process is adopted, a rapidly solidified alloy including a greater volume percentage of amorphous phase, which can be used effectively as a raw alloy for a nanocomposite-type permanent magnet, can be obtained. However, to achieve a processing rate at a mass-producible level by that method, various problems must be overcome as described above. Thus, the present inventors intentionally select a strip casting process although it would be more difficult to form the amorphous structure by the strip casting process than by the jet casting process, and carried out an extensive research on the method of preparing a solidified alloy, including a greater volume percentage of amorphous phase, by the strip casting process.

As a result, the present inventors discovered that when the raw alloy had a composition represented by the general formula: $Fe_{100-x-y-z}R_xQ_yM^z$ (where R is at least one element selected from the group consisting of Pr, Nd, Dy and Tb; Q is B and/or C; M is at least one element selected from the group consisting of Co, Al, Si, Ti, V, Cr, Mn, Ni, Cu, Ga, Zr, Nb, Mo, Ag, Pt, Au and Pb; and x, y and z satisfy 1 at % ≦ x < 6 at %, 15 at % ≦ y ≦ 30 at % and 0 at % ≦ z ≦ 7 at %), a melt having high amorphous formability could be obtained. Thus, the present inventors decided to rapidly cool and solidify that melt by a strip casting process.

The present inventors further looked for specific preferred conditions for the rapid cooling process to increase the percentage of the amorphous phase in a situation where the molten alloy having the particular composition is rapidly cooled and solidified by the strip casting process.

As a result, the present inventors discovered that where the molten alloy has the particular composition described above, a raw alloy for a permanent magnet powder, including at least 60 vol % of amorphous structure, can be obtained by a strip casting process in which the molten alloy is continuously fed onto a chill roller, rotating at a peripheral velocity of 3 m/s to less than 20 m/s, at a feeding rate per unit contact width of 0.2 kg/min/cm to 5.2 kg/min/cm. In addition, according to this method, the rapidly solidified alloy can also be prepared at a melt processing rate of 3 kg/min or more.

In the present invention, the preferred melt feeding rate range is defined by the feeding rates per unit contact width as described above. The reason is as follows. In the strip casting process, the melt contacts with the chill roller so as to have a predetermined contact width in the axial direction of the chill roller. However, the cooling condition of the melt heavily depends on the melt feeding rate per unit contact width. It should be noted that the feeding rate per unit contact width is typically obtained by dividing the feeding rate (unit: kg/min) of the melt that is supplied onto a shoot as a melt guide by the width (unit: cm) of the drain of the shoot (i.e., the contact width of the melt). If the shoot has multiple drains, then the feeding rate per unit contact width is obtained by dividing the feeding rate of the melt being supplied onto the shoot by the sum of the widths of the respective drains.

If the melt feeding rate per unit contact width is too high, then the melt is quenched by the chill roller at a decreased rate. As a result, a rapidly solidified alloy, which has not been amorphized sufficiently but consists mostly of crystallized structure, is made unintentionally. That is to say, a raw alloy suitably applicable to producing a nanocomposite magnet cannot be obtained. On the other hand, if the melt feeding rate is too low, then it would be difficult to bring the melt into contact with the chill roller appropriately by the strip casting process. Thus, according to the present invention, the feeding rate per unit contact width is defined to be 0.2 kg/min/cm to 5.2 kg/min/cm.

Also, if the melt is brought into contact with the chill roller at three contact portions each having a contact width of about 2 cm as will be described later, the feeding rate is preferably defined to be at least about 0.5 kg/min/cm. Then, a processing rate of about 3 kg/min or more is achievable.

As described above, the melt is fed at a feeding rate falling within the prescribed range onto the chill roller that rotates at a peripheral velocity falling within the particular range. In this manner, a rapidly solidified alloy, including a greater volume percentage of amorphous phase, can be manufactured with high productivity even by the strip casting process. The strip casting process uses no nozzle, which would otherwise increase the manufacturing cost significantly as in a jet casting process, for example. Accordingly, no nozzle cost is required and the problems caused by stoppage of the manufacturing process due to nozzle clogging are eliminated.

Thereafter, the resultant rapidly solidified alloy is subjected to a heat treatment for crystallization (which will be sometimes referred to herein as a "heating/crystallizing process") at a temperature of about 550° C. to about 750° C. In this manner, a nanocomposite-type permanent magnet, which includes at least 90% of crystalline structure where soft magnetic phases such as α-Fe phase and/or Fe$_3$B phase and a compound having an R$_2$Fe$_{14}$B crystalline structure coexist, has an average crystal grain size of 10 nm to 50 nm, and exhibits excellent magnetic properties, can be obtained.

Hereinafter, specific embodiments of the present invention will be described with reference to the accompanying drawings.

Figure 2:
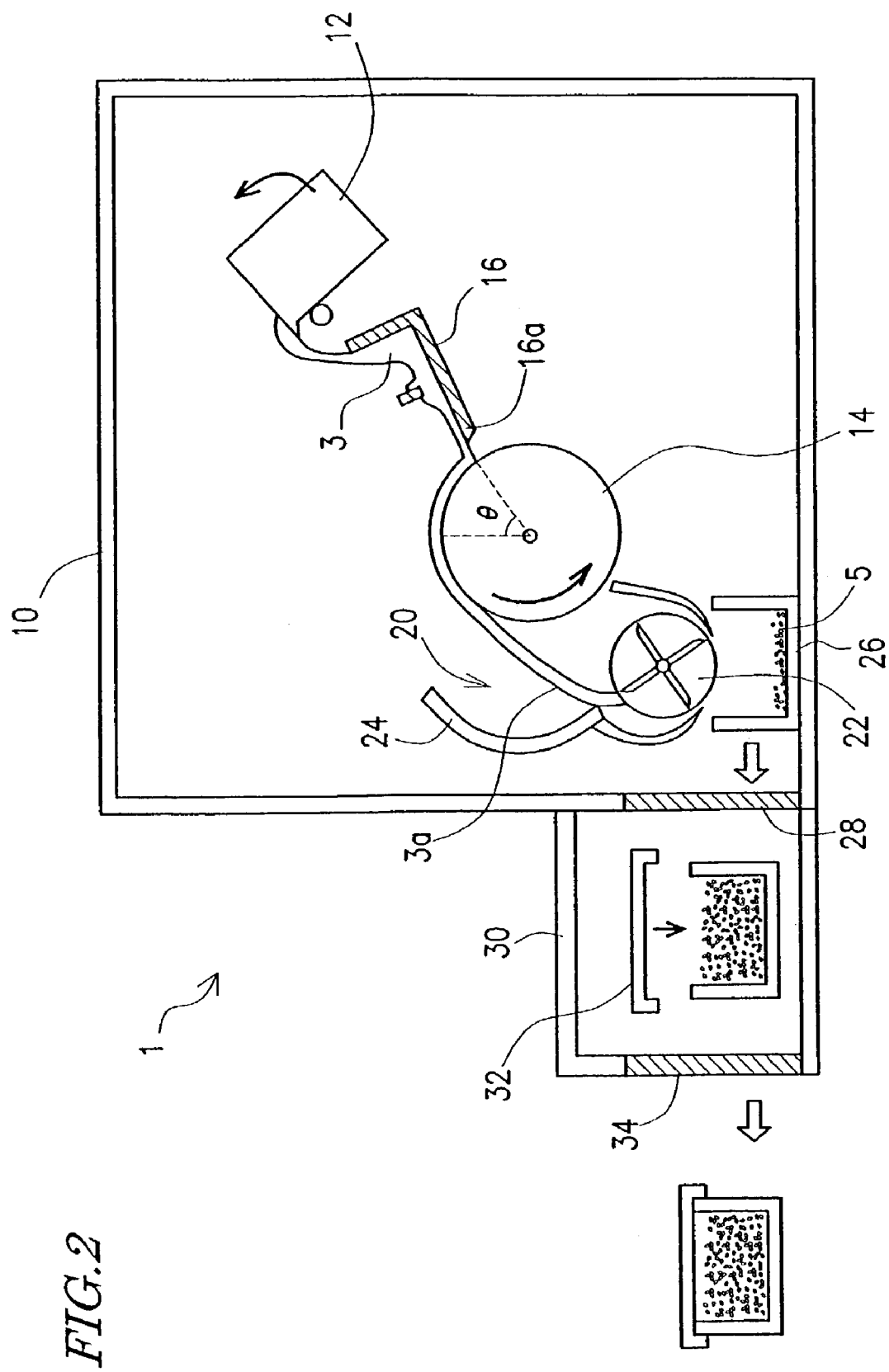
FIG. 2 is a cross-sectional view illustrating the overall configuration of a machine for use to make a rapidly solidified alloy by a strip casting process according to an embodiment of the present invention.

FIG. 2 illustrates a melt quenching machine 1 for use to prepare a rapidly solidified alloy by a strip casting process according to a preferred embodiment of the present invention. The melt quenching machine 1 includes: a main chamber 10 in which either a vacuum or a reduced-pressure inert atmosphere can be created; and a sub-chamber 30, which is connected to the main chamber 10 by way of an openable/closable shutter 28.

In the main chamber 10, provide are a melting crucible 12 for melting a raw alloy therein, a chill roller 14 for rapidly cooling and solidifying the molten alloy 3 that has been fed from the melting crucible 12, a shoot (or tundish) 16 as a melt guiding means for guiding the molten alloy 3 from the melting crucible 12 onto the chill roller 14, and a collecting means 20 for collecting a thin-strip alloy that has been solidified by, and peeled off, the chill roller 14.

The melting crucible 12 can feed the melt 3, prepared by melting the raw alloy, onto the shoot 16 at a substantially constant feeding rate. This feeding rate is arbitrarily adjustable by controlling the operation of tilting the melting crucible 12, for example.

The outer circumference of the chill roller 14 is made of a good thermal conductor (e.g., copper). The roller 14 may have a diameter of 30 cm to 100 cm and a width of 15 cm to 100 cm. The roller 14 can be rotated at a predetermined rotational velocity by a motor (not shown). By controlling this rotational velocity, the peripheral velocity of the chill roller 14 is arbitrarily adjustable. The cooling rate achieved by this melt quenching machine 1 is controllable within a range of about $10^2$ K/sec to about $2 \times 10^4$ K/sec by selecting an appropriate rotational velocity for the chill roller 14, for example.

The end 16a of the shoot 16 is located at such a position as defining an angle θ with a line that connects together the top of the chill roller 14 and the center of the roller. The melt 3, which has been poured onto the shoot 16, is fed onto the chill roller 14 due to its own weight by way of the end 16a.

The shoot 16, made of a ceramic, for example, can rectify the flow of the melt 3 by decreasing the flow velocity of the melt 3 to such a degree as to temporarily reserve the flow of the melt 3 that is being continuously fed from the melting crucible 12 at a predetermined flow rate. This rectification effect can be further increased with a dam plate for selectively damming back the surface flow of the melt 3 that has been poured onto the shoot 16.

By using this shoot 16, the melt 3 can be teemed so as to have a substantially uniform thickness along a certain width in the length direction (or the axial direction) of the chill roller 14. In addition, the shoot 16 can also adjust the temperature of the melt 3 that is about to reach the chill roller 14. The temperature of the melt 3 on the shoot 16 is preferably higher than the liquidus temperature thereof by about 100 K or more. This is because if the temperature of the melt 3 is too low, then initial crystals, which will affect the properties of the resultant rapidly solidified alloy, might locally nucleate and remain in the rapidly solidified alloy. The temperature of the melt on the shoot 16 is controllable by adjusting the temperature of the melt that is being teemed from the melting crucible 12 toward the shoot 16 or the heat capacity of the shoot 16 itself, for example. If necessary, a shoot heater (not shown) may be provided specially for this purpose.

Figure 3:
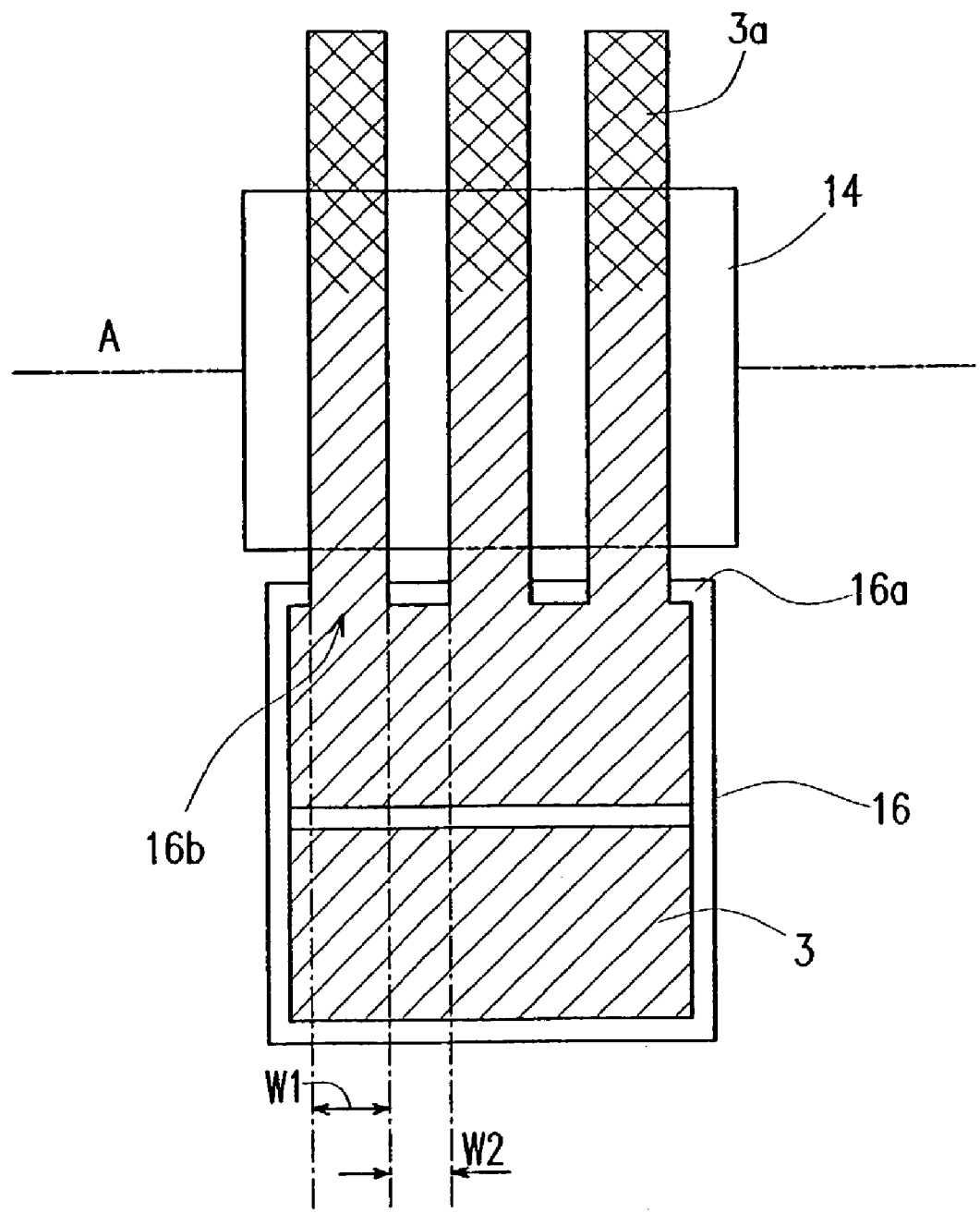
FIG. 3 is a plan view showing the chill roller and the shoot of the machine shown in FIG. 2.

FIG. 3 shows the shoot 16 of this embodiment. The shoot 16 of this embodiment includes multiple drains 16b, which are spaced apart from each other by a predetermined gap W2, at the end 16a thereof that is disposed so as to face the outer circumference of the chill roller 14. The width W1 (i.e., the teeming width) of these drains 16b is preferably defined to be 0.5 cm to 10.0 cm, more preferably 1.5 cm to 4.0 cm. In this embodiment, the teeming width W1 is defined at 2 cm. The melt 3, which has been poured onto the shoot 16, then contacts with the chill roller 14 while substantially maintaining the same width W1 in the axial direction A of the chill roller 14. After having contacted with the chill roller 14 at the teeming width W1, the melt 3 moves on the circumference of the roller as the chill roller 14 rotates (i.e., is brought upward by the chill roller 14). During this movement, the melt 3 is cooled by the chill roller 14. It should be noted that to prevent the melt from leaking through the gap, the distance between the end 16a of the shoot 16 and the chill roller 14 is preferably defined to be 3 mm or less.

The gap W2 between adjacent drains is preferably defined to be 1 cm to 10 cm. If the melt contact region (or melt cooling region) between the melt and the outer circumference of the chill roller 14 is divided into multiple portions in this manner, then the melt that has been teemed from each drain 16b can be cooled effectively. As a result, even if the melt is poured onto the shoot 16 at an increased feeding rate, the desired cooling rate can also be achieved, and a rapidly solidified alloy, including at least 60 vol % of amorphous structure, can also be obtained. Consequently, the processing rate can be increased and the rapidly solidified alloy for a nanocomposite magnet can be mass-produced.

It should be noted that the shoot 16 does not have to have the configuration described above. Alternatively, the shoot 16 may have only a single drain or a greater teeming width.

Referring back to FIG. 2, the molten alloy 3 that has been solidified on the outer circumference of the chill roller 14 then leaves the chill roller 14 as a thin-strip solidified alloy 3a. The solidified alloy 3a peeled is crushed by, and collected in, the collector 20.

The collector 20 includes a rotary blade 22 for use to crush the thin-strip solidified alloy 3a. The rotary blade includes multiple cutting edges that are made of a stainless steel, for example, and is rotated at a velocity of about 500 rpm to about 1,000 rpm by a motor (not shown). The thin-strip solidified alloy 3a, which has been peeled off the chill roller 14, is guided by a guide member 24 onto the rotary blade 22. The solidified alloy 3a to be prepared by the strip casting process of this embodiment is relatively thick (e.g., 70 μm to 250 μm). Accordingly, compared to a relatively thin solidified alloy obtained by the jet casting process, the solidified alloy 3a can be crushed by the rotary blade 22 more easily.

Also, since the thin-strip solidified alloy 3a is relatively thick as described above, the solidified alloy 5 that has been crushed by the rotary blade 22 has an aspect ratio that is even closer to one. Accordingly, the crushed solidified alloy 5 can be stored in the collector box 26 at a high tap density. The solidified alloy 5 is preferably collected at a tap density of at least 1 g/cm$^3$. Then, the collection work can be performed more efficiently.

When the crushed solidified alloy 5 stored in the collector box 26 reaches a predetermined amount, the collector box 26 is transported by some transporting means (not shown) such as a belt conveyer to the sub-chamber 30. In this case, before the shutter 28 is opened, a vacuum or a reduced-pressure inert atmosphere is preferably created in the sub-chamber 30 as well as in the main chamber 10. Then, the vacuum or reduced-pressure state inside the main chamber 10 can be maintained. After the collector box 26 has been brought out from the main chamber 10, the shutter 28 is closed to keep the main chamber 10 airtight.

Thereafter, the collector box 26 is covered with a lid 32 by a mechanism (not shown) inside the sub-chamber 30. The crushed alloy 5 that has been stored airtight inside the collector box 26 in this manner is taken out by opening an openable/closable shutter 34.

As described above, the strip casting process does not use any nozzle unlike the jet casting process. That is to say, the strip casting process does not experience any of various problems associated with the jet casting process. Specifically, in the strip casting process, the melt ejecting speed is not limited by the diameter of the nozzle or the melt is not solidified at the nozzle, either, to clog the nozzle up with the unintentionally solidified alloy. Thus, the strip casting process is very effective for mass production. Furthermore, no nozzle heating equipment or no melt head pressure control mechanism is needed. As a result, the initial equipment cost and equipment operation cost are greatly reduced advantageously.

Also, in the jet casting process, the nozzle is not recyclable and therefore should be disposed of once used even though it usually needs a high processing cost to form the nozzle. In contrast, the strip casting process allows a repeated use of the shoot, thus requiring a much lower equipment operation cost.

Furthermore, in the strip casting process of the present invention, the roller can be rotated at a relatively low velocity and the weight of the molten alloy teemed can be increased as compared to the jet casting process. Thus, the resultant thin strip can be thickened and can be collected easily.

Reasons Why this Composition is Preferred

The rare earth element R is an element indispensable for $R_2Fe_{14}B$, which is a hard magnetic phase needed to exhibit permanent magnet properties. In the present invention, R includes at least one element selected from the group consisting of Pr, Nd, Dy and Tb. However, to control the amorphous formability and the crystallization temperature, any other rare earth element may be substituted for a portion of R. The mole fraction of R should not be lower than 1 at % because the coercivity could not be increased so effectively at an R mole fraction of less than 1 at %. However, if the R mole fraction is 6 at % or more, then no hard magnetic $R_2Fe_{14}B$ phase will be produced and the coercivity will decrease significantly. In view of these considerations, the mole fraction x of R preferably satisfies $1 \leq x < 6$.

Q is B (boron) and/or C (carbon). B is an indispensable element for an iron-based boride such as a soft magnetic $Fe_3B$ phase and the hard magnetic $R_2Fe_{14}B$ phase, which are main phases of a nanocomposite-type permanent magnet material. If the mole fraction y of B is out of 15–30 at % range, then the permanent magnet properties are not achievable. For that reason, the B mole fraction y preferably satisfies $15 \leq y \leq 30$. As used herein, "$Fe_3B$" includes $Fe_{3.5}B$, which is almost non-distinguishable from $Fe_3B$.

Furthermore, if B is lower than 15 at %, then the amorphous formability of the melt would decrease significantly. In that case, if a rapidly solidified alloy is prepared by a strip casting process as in the present invention, the amorphous phase will not be formed sufficiently. Even when such a rapidly solidified alloy is heated and crystallized, no metal structure having good magnet properties can be obtained. It should be noted that C may be substituted for up to 50% of B because the magnetic properties or metal structure would not be affected by the substitution.

The balance of the raw alloy, other than the elements described above, may be Fe alone, a portion of which may be replaced with Co, though. Then, the loop squareness of the demagnetization curve will improve and the maximum energy product $(BH)_{max}$ will increase. Furthermore, a portion of Fe may also be replaced with at least one element that is selected from the group consisting of Al, Si, V, Cr, Mn, Ni, Cu, Ga, Zr, Nb, Mo, Ag, Ta, W, Pt, Au and Pb because permanent magnet properties are also improvable then. However, if the total mole fraction z of the at least one substituent to be selected from the group consisting of Co, Al, Si, V, Cr, Mn, Ni, Cu, Ga, Zr, Nb, Mo, Ag, Ta, W, Pt, Au and Pb, contributing to achieving these effects, exceeds 7 at %, then the magnetization would decrease. Thus, a preferred z range is $0 \leq z \leq 7$ at %. Also, since more remarkable effects are achieved when z is 0.5 at % or more, a more preferred z range is $0.5 \leq z \leq 7$ at %.

Reasons Why these Manufacturing Conditions are Preferred

In the present invention, a molten alloy having the particular composition described above is rapidly cooled and solidified by a strip casting process to be carried out with the melt quenching machine 1 shown in FIG. 2, thereby obtaining a thin-strip alloy. The molten alloy is fed onto a chill roller, which is rotating at a peripheral velocity of 3 m/s to less than 20 m/s in a vacuum or a reduced-pressure inert gas atmosphere, at a feeding rate per unit contact width of 0.2 kg/min/cm to 5.2 kg/min/cm. In this manner, a rapidly solidified alloy, including at least 60 vol % of amorphous structure, can be prepared. By subjecting the raw alloy including the amorphous structure at such a high percentage to a heating/crystallizing process, a nanocomposite-type magnet, exhibiting good magnetic properties, can be obtained.

The following is the reasons why the chill roller preferably has a peripheral velocity of 3 m/s to less than 20 m/s as described above. Specifically, if the peripheral velocity of the roller is less than 3 m/s, then the cooling ability would be too low to obtain a rapidly solidified alloy including at least 60 vol % of amorphous structure. On the other hand, if the peripheral velocity of the roller is 20 m/s or more, then it would be difficult to move the melt upward on the roller. In that case, the cooled alloy would scatter as thin flakes, thus making it hard to collect them. The best peripheral velocity is changeable with the specific structure or material of the chill roller or the melt feeding rate, for example. Generally speaking, though, if the peripheral velocity is high, then the resultant thin-strip alloy will be extremely thin, bulky and hard to handle. On the other hand, if the peripheral velocity is low, it becomes difficult to achieve a sufficient cooling rate. Nevertheless, if the melt feeding rate is decreased to increase the cooling rate, then the productivity will decline and the advantages of the strip casting process will diminish. In view of these considerations, the chill roller preferably has a peripheral velocity of 5 m/s to 15 m/s, more preferably 6 m/s to 10 m/s.

The following is the reasons why the feeding rate per unit contact width is preferably 5.2 kg/min/cm or less as described above. Specifically, if the feeding rate exceeds 5.2 kg/min/cm, then the predetermined cooling rate is not achievable and the desired rapidly solidified alloy including at least 60 vol % of amorphous structure cannot be obtained. The preferred range of the feeding rate per unit contact width is changeable with the specific peripheral velocity or structure of the roller. For example, the feeding rate per unit contact width is preferably 4.0 kg/min/cm or less, more preferably 3.0 kg/min/cm or less.

Also, the feeding rate per unit contact width is preferably at least 0.2 kg/min/cm for the following reasons. Specifically, if the feeding rate is less than 0.2 kg/min/cm, then the melt cannot be supplied steadily onto the chill roller at a sufficient flow rate, no good contact is ensured between the melt and the roller, and the melt puddle cannot be formed constantly on the chill roller. Accordingly, the thin-strip rapidly solidified alloy will be formed in fragments. That is to say, the raw alloy will be rapidly cooled and solidified non-uniformly. When the rapid cooling state is variable in this manner, the desired rapidly solidified alloy for a nanocomposite magnet, including a predetermined volume percentage of amorphous structure, cannot be obtained constantly.

Furthermore, if the melt feeding rate (or the processing rate) of the overall machine is less than 3 kg/min, then the productivity is poor and the material cannot be supplied cost-effectively. For that reason, the melt feeding rate of the overall machine is preferably at least 3 kg/min. However, to achieve such a high productivity, the shape of the shoot and the shape and peripheral velocity of the chill roller need to be selected so carefully that at least 3 kg of the melt can be processed per minute while the conditions to feed the melt at 0.2 kg/min/cm to 5.2 kg/min/cm per unit contact width are satisfied as described above.

For example, suppose a shoot including three drains 16b with a (teeming) width of 2 cm is used as shown in FIG. 3. In that case, even if the melt is supplied onto the shoot at a feeding rate of 3.0 kg/min, the melt feeding rate per unit contact width will be 0.5 kg/min/cm (=3.0 (kg/min)÷(2×3) (cm)). Thus, it can be seen that a rapidly solidified alloy including the amorphous structure at a high percentage can be obtained constantly.

Also, the present inventors discovered that when a Cu roller having a diameter of about 30 cm to about 50 cm and a width of about 50 cm was used and rotated at a peripheral velocity of 5 m/s to 10 m/s, the feeding rate per unit contact width was preferably about 0.5 kg/min/cm to about 3.0 kg/min/cm. In that case, if a shoot having an appropriate shape is used, then the rapid cooling process may also be carried out at a feeding rate of 5 kg/min to 15 kg/min.

By appropriately determining the shape of the shoot (tundish), the width and the number of melt drains and the melt feeding rate, for example, the resultant thin-strip rapidly solidified alloy can have an average thickness and width that are within preferred ranges. The thin-strip rapidly solidified alloy preferably has a width of 15 mm to 80 mm. Also, the thin-strip alloy may not be too thin or too thick. If the solidified alloy is too thin, then the tap density thereof will be low and it is hard to collect the alloy as intended. Nevertheless, if the solidified alloy is too thick, then the alloy may have been cooled on the melt/roller contact surface and on the free surface (i.e., melt surface) at mutually different cooling rates. That is to say, a portion of the alloy around the free surface may have been cooled at an insufficient rate. In view of these considerations, the thin-strip alloy preferably has a thickness of 70 $\mu$m to 250 $\mu$m, more preferably 100 $\mu$m to 200 $\mu$m.

In a situation where a reduced-pressure inert atmosphere is created in the chamber, if the pressure of the inert atmosphere is too high during the casting process, then the inert gas around the roller might be absorbed into the alloy unintentionally while the chill roller is rotating at a high velocity. In that case, desired constant cooling state is not achievable. On the other hand, if the pressure of the inert atmosphere is too low, then the thin-strip alloy, which has left the roller, will not be cooled by the inert gas quickly enough. Thus, the thin-strip alloy will be crystallized excessively and an alloy including a greater volume percentage of amorphous phase cannot be obtained. In that case, the alloy to be obtained by the heating/crystallizing process will have deteriorated magnetic properties. In view of these considerations, the inert gas is preferably controlled to have a pressure of 1 kPa to 50 kPa.

Methods of Evaluating Rapidly Solidified Alloy

As described above, if there is a greater volume percentage of crystalline structure in the metal structure obtained by the strip casting process, the crystalline portions will grow excessively during the subsequent heat treatment process, thus affecting the magnetic properties adversely. Accordingly, it is important to obtain an alloy including a greater volume percentage of amorphous phase by a strip casting process. To achieve this purpose, it is effective to quantitatively estimate the percentage of the amorphous phase to an actually obtained rapidly solidified alloy.

The present inventors discovered that a method of quantitatively estimating the volume percentage of the amorphous phase by crushing the thin strip cast alloy and obtaining the quantity of heat generated during crystallization by a thermal analysis was a simple but highly accurate method. Thus, the present inventors decided to adopt such a method.

As will be described for the following examples, according to this evaluating method, it was discovered that when the $Fe_3B$ phase as a main phase generated a heat quantity of 28 J/g or more, the magnet powder to be obtained by the subsequent heating/crystallizing process exhibited good magnetic properties. The quantity of heat that was generated by an alloy, which had been obtained at an excessive cooling rate and was supposed to be 100% amorphous, during the main-phase crystallization process measured about 45 J/g. Thus, the generated heat quantity of 28 J/g or more substantially means that the alloy had a metal structure including at least 60 vol % of amorphous structure.

The present inventors also discovered that a method of quantitatively estimating the volume percentage of the amorphous phase by crushing the thin strip cast alloy and measuring the coercivity thereof was a simple but highly accurate method. Thus, the present inventors decided to adopt such a method.

An amorphous structure is believed to have almost no coercivity. Accordingly, if the thin-strip rapidly solidified alloy actually obtained has a low coercivity $H_{cJ}$, then the alloy may be regarded as including a greater volume percentage of amorphous phase. More specifically, if the alloy yet to be subjected to the heating/crystallizing process has a coercivity $H_{cJ}$ of 10 kA/m or less, then a magnet powder to be obtained subsequently by the heating/crystallizing process exhibits good magnetic properties. Thus, the present inventors decided that the coercivity $H_{cJ}$ be preferably 10 kA/m or less.

EXAMPLES AND COMPARATIVE EXAMPLES

Respective materials were mixed in such a manner as to obtain raw alloys having various compositions as represented by Nos. 1 through 11 in the following Table 1. Then, the raw alloys were subjected to a strip casting process under the casting conditions shown in Table 1. Subsequently, each of the resultant alloys was pulverized to obtain 20 g of powder that had been sieved to sizes of 150 $\mu$m or less. In this manner, alloy powders to be evaluated (or sample powders) were obtained. These alloy powders to be evaluated were subjected to a thermal analysis and magnetic property evaluations. The thermal analysis (i.e., measurement of the quantity of heat generated during crystallization) was carried out using a differential scanning calorimeter (DSC). Specifically, the measurement was carried out on 40 mg of powder at a temperature rise rate of 10° C./min in a temperature range of 550° C. to 650° C. On the other hand, the magnetic properties were evaluated using a vibrating sample magnetometer (VSM). Specifically, the evaluation was carried out on 50 mg of powder at a maximum magnetic field strength of 1.6 MA/m.

TABLE 1

| | | Alloy composition (at %) | | | | Manufacturing conditions | | | |
|---|---|---|---|---|---|---|---|---|---|
| | | R | M | | | Roller Peripheral Velocity | Melt Feeding Rate | Per Contact Width | Pressure of casting atmosphere |
| | | Nd | B | Co | Cr | Fe | (m/s) | (kg/min) | (kg/min/cm) | (kPa) |
| EXAMPLES | 1 | 4.5 | 18.5 | 0.0 | 0.0 | 77.0 | 6 | 8 | 2.0 | 8 |
| | 2 | 4.5 | 18.5 | 2.0 | 2.0 | 73.0 | 8 | 8 | 2.0 | 8 |
| | 3 | 4.8 | 18.5 | 2.2 | 2.2 | 72.3 | 6 | 12 | 3.0 | 8 |
| | 4 | 4.5 | 17.0 | 3.0 | 0.0 | 75.5 | 8 | 12 | 3.0 | 8 |
| | 5 | 4.5 | 18.0 | 0.0 | 3.0 | 74.5 | 6 | 8 | 2.0 | 8 |
| | 6 | 3.8 | 18.5 | 3.0 | 0.8 | 74.0 | 8 | 8 | 2.0 | 8 |
| | 7 | 5.0 | 18.0 | 3.0 | 3.0 | 71.0 | 6 | 12 | 3.0 | 8 |
| | 8 | 5.5 | 18.5 | 5.0 | 5.0 | 66.0 | 8 | 12 | 3.0 | 8 |
| COM | 9 | 4.8 | 10.0 | 2.2 | 2.2 | 80.8 | 8 | 8 | 2.0 | 8 |
| | 10 | 4.5 | 18.5 | 2.0 | 2.0 | 73.0 | 1 | 6 | 1.0 | 8 |
| | 11 | 3.8 | 18.5 | 3.0 | 0.8 | 74.0 | 8 | 35 | 5.8 | 8 |

As for the respective sample powders (Samples) Nos. 1 to 11, the quantities of heat generated (J/g) by the main phase (i.e., the $Fe_3B$ compound phase) during the crystallization and before the heat treatment, which were obtained by the thermal analysis, and the coercivity (kA/m) before the heat treatment are shown in the following Table 2. The magnetic properties (i.e., remanence $B_r$, coercivity $H_{cJ}$ and maximum energy product $(BH)_{max}$) of permanent magnet powders, which were obtained by subjecting these sample powders to the heat treatment for 30 minutes at the heat treatment temperatures shown in Table 2, are also shown in Table 2.

Figure 5:
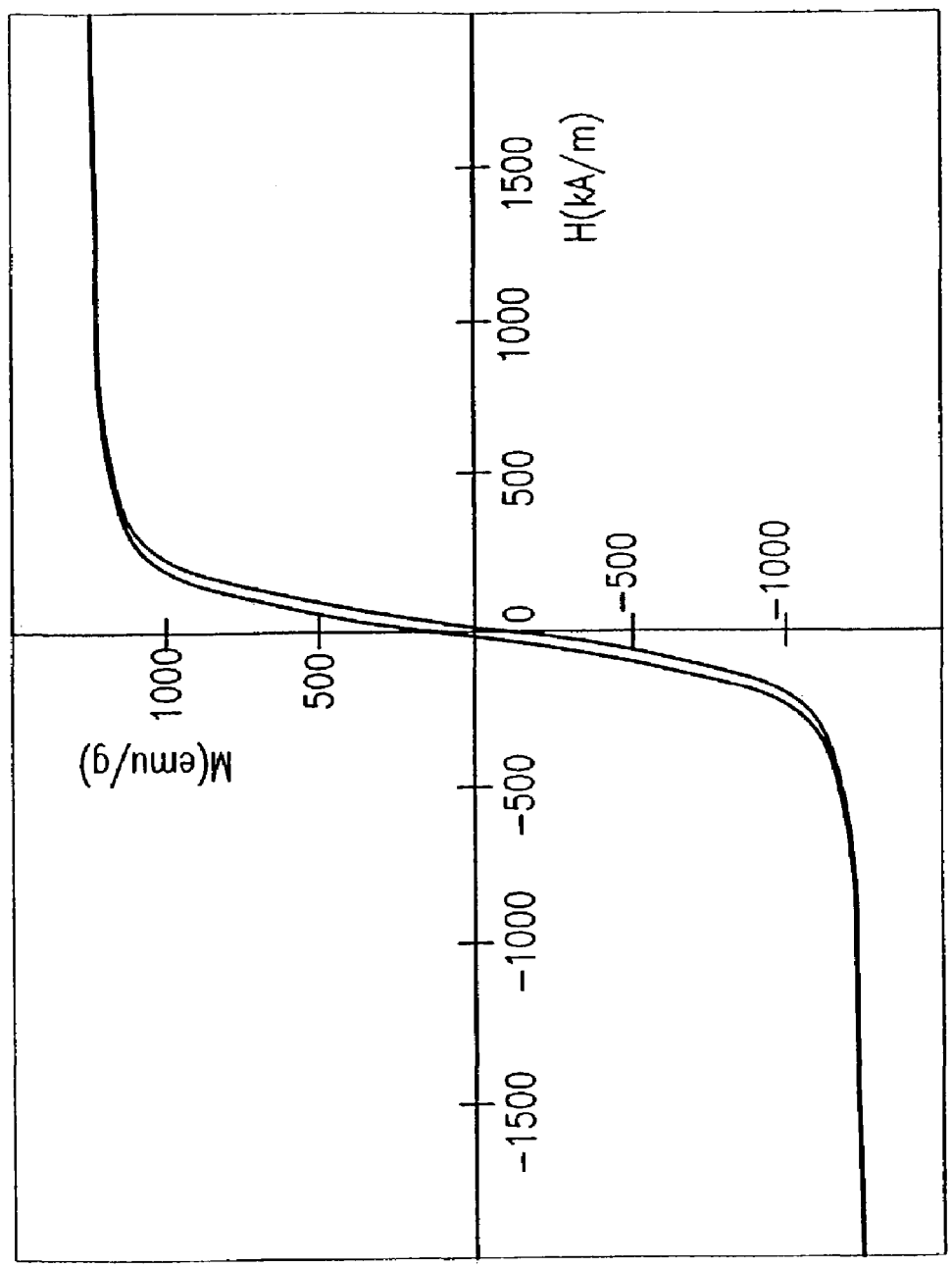
FIG. 5 shows the magnetic hysteresis loop of the pre-heat-treated sample powder prepared as the example.
Figure 6:
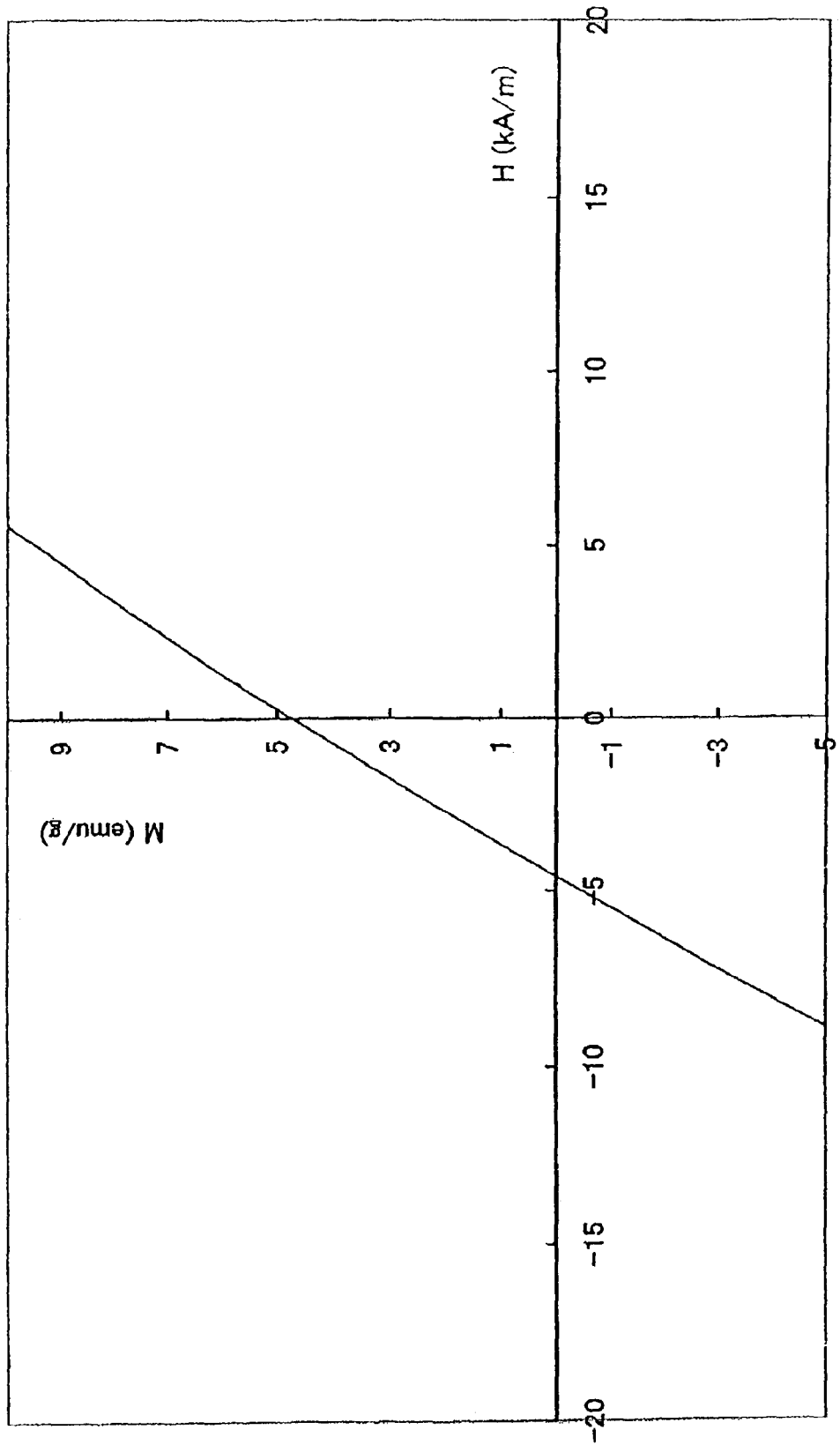
FIG. 6 shows a portion of FIG. 5 around the origin thereof on a larger scale.

FIG. 5 shows the magnetic hysteresis loop of a sample that exhibited good magnetic properties after the heat treatment. FIG. 6 shows a portion of FIG. 5 near the origin on a larger scale. Each of Samples Nos. 1 through 8 representing examples of the present invention exhibited a coercivity of less than 10 kA/m as a result of the magnetic property evaluation. Each of these samples, which is believed to include at least 60 vol % of amorphous phase after the casting process, also exhibited good magnetic properties even after having been subjected to the heat treatment for crystallization.

TABLE 2

| | | Pre-heat-treatment Thermal analysis result Quantity of heat (J/g) generated by main phase during crystallization | Pre-heat-treatment coercivity $H_{cJ}$ (kA/m) | Heat Treatment temperature (° C.) | Post-heat-treatment Magnetic properties | | |
|---|---|---|---|---|---|---|---|
| | | | | | $B_r$ (T) | $H_{cJ}$ (kA/m) | $(BH)_{max}$ (kJ/m³) |
| EXAMPLES | 1 | 33.1 | 3.9 | 640 | 0.95 | 280 | 71 |
| | 2 | 37.4 | 3.9 | 690 | 1.00 | 370 | 89 |
| | 3 | 28.1 | 4.5 | 680 | 0.97 | 400 | 83 |
| | 4 | 31.8 | 4.2 | 630 | 0.96 | 300 | 76 |
| | 5 | 35.3 | 4.1 | 660 | 0.93 | 355 | 79 |
| | 6 | 39.6 | 3.9 | 630 | 1.03 | 280 | 85 |
| | 7 | 30.3 | 4.7 | 700 | 0.85 | 500 | 74 |
| | 8 | 33.5 | 4.5 | 710 | 0.80 | 620 | 73 |
| COM | 9 | 12.8 | 95.3 | 680 | 0.73 | 340 | 42 |
| | 10 | 3.4 | 302.6 | 690 | 0.54 | 220 | 31 |
| | 11 | 7.9 | 265.9 | 630 | 0.66 | 200 | 34 |

Figure 4:
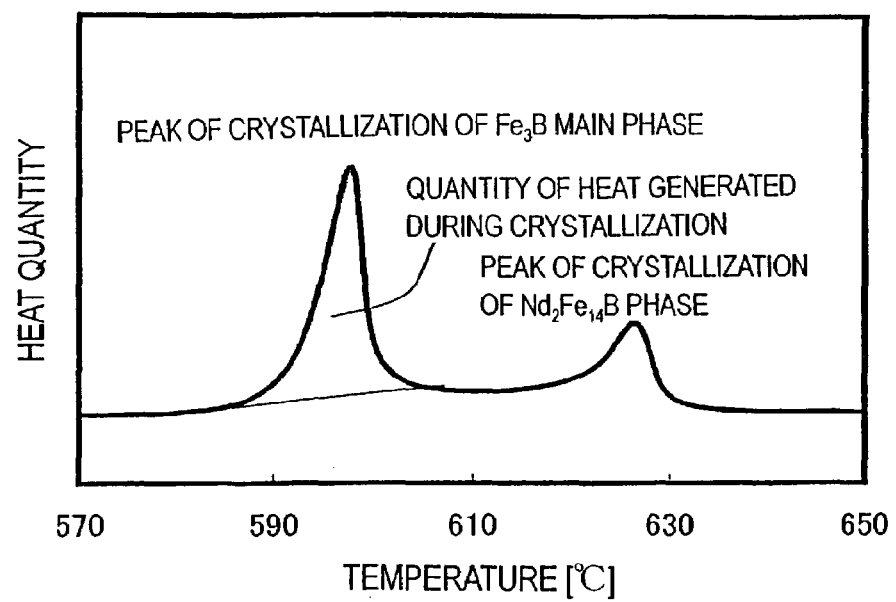
FIG. 4 shows the thermal analysis curve of a pre-heat-treated sample powder prepared as an example.

FIG. 4 shows the thermal analysis curve that was obtained by subjecting a sample, exhibiting good magnetic properties after the heat treatment, to the thermal analysis. In this thermal analysis curve, peaks of heat generation with crystallization are identifiable for two types of phases that crystallize during the temperature rising process. Each of the quantities of heat generated during crystallization as shown in Table 2 was calculated by obtaining the area of this first peak. As can be seen from Table 2, each of Samples Nos. 1 through 8 representing examples of the present invention generated a heat quantity of more than 28 J/g during the crystallization of its main phase as obtained by the thermal analysis. Thus, each of these samples can be regarded as including at least 60 vol % of amorphous phase.

On the other hand, each of Samples Nos. 9 to 11 representing comparative examples generates a small quantity of heat during the crystallization of its main phase and has a high coercivity. Each of these samples representing the comparative examples is believed to include at most 30 vol % of amorphous phase in the as-cast state. As for Sample No. 9, the percentage of the amorphous phase to the resultant rapidly solidified alloy was low because its raw alloy has a composition including B at a low fraction and having low amorphous formability. In each of Samples Nos. 10 and 11, the percentage of the amorphous phase was also low. This is probably because a sufficient cooling rate was not achieved due to an excessively low roller peripheral velocity or an excessively high melt feeding rate. Also, even after having been subjected to the heat treatment for crystallization, each of these samples representing the comparative examples still exhibited deteriorated magnetic properties as opposed to Samples Nos. 1 through 8 representing examples of the present invention. This is probably because the crystalline phase, existing profusely in those samples even before the heat treatment, would have grown excessively as a result of the heat treatment.

These results of measurement suggest that to be a permanent magnet powder exhibiting good magnetic properties after the heat treatment, the raw alloy preferably consists mostly of amorphous phase. According to the present invention, by adopting a particular composition range and appropriate manufacturing conditions, a raw alloy including at least 60 vol % of amorphous phase can be obtained by a cost-effective strip casting process, not the conventional jet casting process that is far from being effective for mass production.

INDUSTRIAL APPLICABILITY

According to the present invention, a method of making a raw alloy for a nanocomposite-type magnet by a strip casting process is provided. By adopting this method for industrial production, the nanocomposite-type magnet raw alloy can be prepared at a lower cost than the conventional process. The strip casting process adopted in the present invention requires a reduced manufacturing cost, and is effective for mass production. Thus, a permanent magnet powder, exhibiting excellent magnetic properties that cannot be achieved by any hard ferrite magnet, can be provided at a lower cost.

What is claimed is:

1. A method of making a raw alloy for a magnet, the method comprising the steps of:
    preparing a molten alloy represented by $Fe_{100-x-y-z}R_xQ_yM_z$ where R is at least one element selected from the group consisting of Pr, Nd, Dy and Tb; Q is B and/or C; M is at least one element selected from the group consisting of Co, Al, Si, Ti, V, Cr, Mn, Ni, Cu, Ga, Zr, Nb, Mo, Ag, Pt, Au and Pb; and x, y and z satisfy $1$ at $\% \leq x < 6$ at $\%$, $15$ at $\% \leq y \leq 30$ at $\%$ and $0$ at $\% \leq z \leq 10$ at $\%$; and
    obtaining a thin-strip alloy, including an amorphous structure, by a strip casting process, in which the molten alloy is brought into contact with a chill roller within a vacuum or in a reduced pressure atmosphere so as to have a predetermined contact width in an axial direction of the chill roller and in which the molten alloy is moved along an outer circumference of the chill roller and cooled by rotating the chill roller;
    wherein the chill roller is rotated at a peripheral velocity of 3 m/s to less than 20 m/s, and
    wherein the molten alloy is continuously fed onto the chill roller at a feeding rate per unit contact width of 0.2 kg/min/cm to 5.2 kg/min/cm.

2. The method of claim 1, wherein the molten alloy is fed onto the chill roller at a feeding rate of at least 3 kg/min.

3. The method of claim 1 or 2, wherein the molten alloy is brought into contact with the chill roller by way of a shoot, the shoot controlling the flow of at least a portion of the molten alloy toward the chill roller, and
    wherein the shoot includes a plurality of melt drains, each of which is located in the vicinity of the chill roller and which has a predetermined teeming width as measured in the axial direction of the chill roller, and
    whereby multiple thin-strip alloys are made from the molten alloy that has passed through the melt drains and contacted with the chill roller.

4. The method of claim 1, wherein the predetermined contact width is 0.5 cm to 10.0 cm.

5. The method of claim 1, wherein the thin-strip alloy has a metal structure that includes at least about 60 volume percent of amorphous structure.

6. The method of claim 1, further comprising the step of continuously crushing the thin-strip alloy and collecting the crushed alloy such that a tap density thereof becomes at least equal to 1 g/cm³.

7. A magnet raw alloy prepared by the method of claim 1, wherein the raw alloy has a coercivity $H_{cJ}$ of at most 10 kA/m before being heated and crystallized.

8. The raw alloy of claim 7, wherein the raw alloy has a thickness of 70 µm to 250 µm.

* * * * *